2,826,505

POROUS MEDIA

James Dennis Jones, Leaside, Ontario, Canada

No Drawing. Application December 7, 1955
Serial No. 551,501

1 Claim. (Cl. 106—40)

This is a continuation-in-part of application Serial Number 491,227, filed February 28, 1955, which is a continuation-in-part of application Serial Number 330,018, filed January 7, 1953, both now abandoned.

The invention relates to a porous body constructed of rice hull ash of the type wherein the pores are interconnecting.

Rice hulls are thin concavo-convex plant tissues having surface irregularities related to the internal cell structure of the hull. Rice hulls contain about 20% silica and when the hulls are burned so that the carbonaceous matter is substantially removed the ash resulting therefrom contains about 96% silica. Because the silica is distributed with substantial uniformity throughout the rice hull, the ash fragments possess the same general shape as the original hull and in fact form a siliceous skeleton which reveals substantially all the morphological features of the original hull, including the concavo-convex shape and the surface irregularities and in addition exhibit a certain degree of porosity deriving in large part from the calcination and consequent removal of organic matter.

When a mass of rice hull ash fragments with random orientations is molded together (preferably under pressure) with a suitable bonding agent a useful interconnecting porous body is formed with interconnecting passages formed therein. The interconnecting passages are due to the following factors:

(a) The relatively large size of the rice hull ash fragments tends to produce voids between adjacent fragments.

(b) The concavities in the fragments tend to shape capillary passages since it is statistically unlikely that the concavity of one fragment will correspond to the convexity in an adjacent fragment or that such correspondence will often occur throughout the product.

(c) In any event the surface irregularities which vary from hull to hull tend to produce passages between adjacent hulls.

(d) The innate porosity of the siliceous ash skeleton structure itself.

These four factors do not only produce capillary voids but in the product tend to produce interconnected voids which provide fluid conduits.

A body thus formed with interconnecting voids providing tortuous passageways through the mass is suitable as an absorptive medium for acoustic energy.

Such passages can act as capillary or as conventional conduits through the body when shaped to the desired dimensions to utilize such features, as for example in humidifier plates and filters.

By controlling the conditions of manufacture, the median cross-sectional bore area may be varied to suit the demands of any particular application.

Moreover, due to the hull-shaped, substantially laminal form of the individual rice hull ash fragments and the strength of such fragments due to their high silica content, each fragment tends to act as a miniature leaf spring and has a moderate resiliency. Thus the body produced therefrom has a limited resiliency under moderate bending moments.

In particular the invention has been found valuable in the production of humidifier plates.

With humidifier plates constructed of conventional materials difficulty is encountered in achieving the desired capillarity.

When the randomly oriented rice hull ash fragments are bonded together (preferably under pressure) with a suitable bonding agent a useful humidifier plate is formed with excellent absorption characteristics. The limited resiliency of the product reduces the breakages thereof under moderate stress.

The suitable bonding agent may be of any type but preferably is of a ceramic nature which appears in the finished product in the vitreous phase and preferably is formed from a compound which forms a vitreous phase on firing to appropriate temperatures. Thus the specific embodiment refers to the use of ball clay.

The bonding agent should be mixed with the rice hull ash fragments prior to shaping and after shaping will be fired, if of the type which forms a vitreous phase upon firing. Whatever the type of bonding agent used an additional operation will probably be necessary to render the bonding agent effective after the shaping step and such operation should be considered to be within the scope of this invention. In some cases firing will not be required as with a plastic bonding agent.

In the specific embodiment of the invention a humidifier plate is formed by taking a dry mixture comprising mainly particles of rice hull ash, 15% of ball clay; as much as 7% of hydrated lime may be used to serve as a flux for the clay; and if considered necessary a suitable agglutinant such as a pregelatinized starch is added in the amount of 5% by weight of the rice hull ash. Water up to about 60% of the weight of the rice hull ash is then added to the dry mixture and mixing continued until thorough distribution of the water throughout the mixture is effected. This final mixture is loaded into a suitable die and subjected to a molding pressure of about 400 pounds per square inch to form a shaped plate which is removed from the die and fired after drying at a temperature between 1800° F. and 2350° F. The lower temperature corresponds to a lime content of about 10% and the higher temperature to a lime content of about 5%. After firing, a product is obtained which will advantageously serve as a humidifier plate. The shape may be chosen to fit the individual application. Usually such shape will be relatively thin and probably of uniform thickness of the general order of three-sixteenth inch (3/16"). The body so formed contains a number of capillary passages arising out of the factors described in column 1. The number of voids is far greater, and a greater proportion tend to confer effective capillarity than can be accomplished by prior techniques known to me. The high refractory qualities of the rice hull ash allow the ash to maintain its laminar structure at firing temperatures and allows the formation of a strong vitreous bond after firing.

Alternatively I may substitute for 15% of ball clay and 7% hydrated lime, about 20% of clay without using hydrated lime and do not require the use of an additional agent such as pregelatinized starch to supply the necessary unfired strength. In such a composition the firing temperature would be in the neighborhood of 2350° F. The use of a flux, however, gives greater strength for the amount of clay used. It will be understood that a clay will be chosen to meet specific requirements. A higher percentage of refractory than ball clay may be used and for a reasonable amount of green strength a reasonable amount of plasticity in the clay is required.

In the preferred inventive product the bonding material for the rice hull ash particles is present in the vitreous phase. While I have directly formed a vitreous bond by employing powdered glass, frit and glass fibres as a bonding material for the rice hull ash, I prefer to employ materials developing a vitreous character upon firing, such as ball clay or any other appropriate aluminosilicate, alone or in combination with suitable fluxes.

A larger quantity of rice hull ash will require a higher firing temperature. Up to 95% rice hull ash may be used in the mixture. A large amount of rice hull ash will, under comparable manufacturing conditions, provide a greater multitude of voids in the final structure and is a more resilient article. The less amount of rice hull ash, the more dense and stronger will be the resulting refractory body. Bodies of good strength for service as a humidifier plate may be provided with mixtures containing greater than 70% rice hull ash.

In the production of articles such as filters or vents wherein the interconnecting pores are required to be of larger size the proportion of rice hull ash used should be higher and/or the molding pressure decreased to the empiric value found necessary.

I claim:

A body having capillary passages extending therethrough comprising: a molded mass consisting essentially of porous rice hull ash particles of irregular concavo-convex shape and having surface irregularities, said particles being disposed in random orientations with respect to one another; and being bonded together by a suitable bonding agent whereby the said porosity, concavo-convex shape, the surface irregularities and the random orientations cause the occurrence of, and control the size of said capillary passages.

References Cited in the file of this patent

FOREIGN PATENTS 336,440  Great Britain ------------------ 1930